(No Model.)
O. J. BOWSER.
BARREL TRUCK.
No. 530,577.   Patented Dec. 11, 1894.
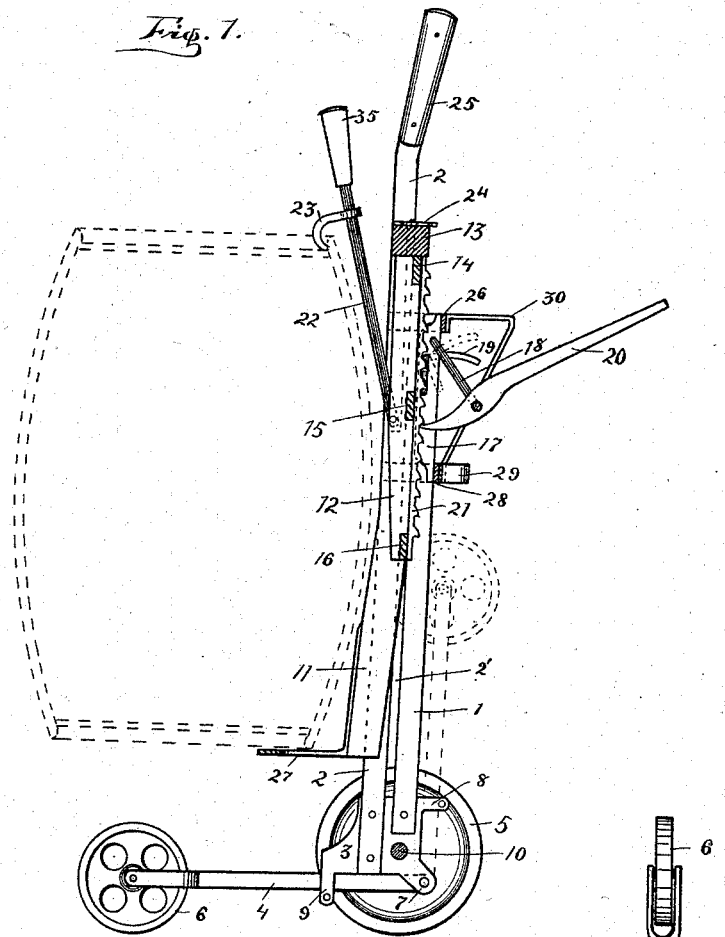
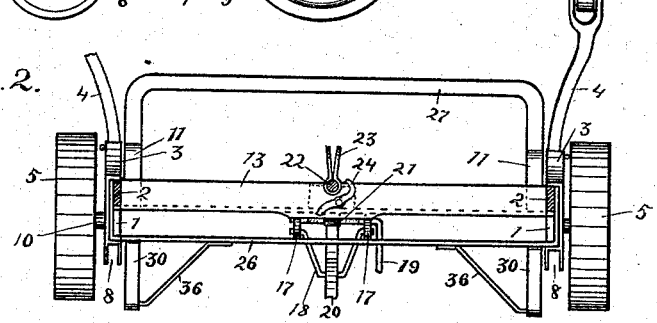
WITNESSES:   Orra J. Bowser   INVENTOR
BY Chapin & Denny
his ATTORNEYS

UNITED STATES PATENT OFFICE.

ORRA J. BOWSER, OF FORT WAYNE, INDIANA.

BARREL-TRUCK.

SPECIFICATION forming part of Letters Patent No. 530,577, dated December 11, 1894.

Application filed April 20, 1894. Serial No. 508,301. (No model.)

*To all whom it may concern:*

Be it known that I, ORRA J. BOWSER, a citizen of the United States, residing at Fort Wayne, in the county of Allen, in the State of Indiana, have invented certain new and useful Improvements in Barrel-Trucks; and I do hereby declare that the following is a full, clear, and exact description of the invention, which will enable others skilled in the art to which it appertains to make and use the same, reference being had to the accompanying drawings, which form part of this specification.

My invention relates to improvements in barrel trucks.

The object of my invention is to provide a cheap, substantial, and convenient hand-truck which can be used for all general purposes for which hand-trucks are required, but which is specially adapted for removing and elevating heavy barrels of molasses, vinegar, and other merchandise of like character, into a position upon a suitable base or support from which the contents can be conveniently drawn, and also adapted for use in transporting and elevating stoves, blocks of stone or marble to a suitable position for the stone cutter and like purposes.

My invention consists of a truck-frame having pivoted and wheel mounted arms, and provided with an elevating hand-lever and a holding pawl or yoke, and a sliding frame securely mounted upon said truck frame and longitudinally adjustable in proper grooves or guideways therein, and provided with a loading ledge, adjustable hooks and a central rack-bar adapted for engagement with the said lever and the said holding yoke or pawl.

The novel feature of my invention is found in the described means for raising and lowering a heavy barrel or other load when mounted upon my improved truck.

Similar figures of reference indicate corresponding parts throughout the several views forming part of this specification.

Figure 1 is a vertical section of my improved elevating truck with a barrel, shown in dotted outline, in position thereon, showing the relative arrangement of the operating mechanism. Fig. 2 is a plan of my invention, partly in section, when elevated to the position shown in Fig. 1.

The main truck consists of the side bars or rails 1 and 2, both sides thereof having their front ends rigidly secured to the plates 3, Fig. 1, which plates are connected by the transverse rod 10; the bars 2 being rearwardly extended and provided with proper handles 25. The said side bars 1 and 2 are arranged with a space 2' between them, adapted to serve as a guide-way for the surmounted sliding frame hereinafter described, and are further secured in that position by the cross plates 26 and 28, which have their ends bent upward and then riveted or otherwise secured to the said bars 1 and 2, as seen in Fig. 2. Upon the ends of the rod 10 are properly mounted suitable wheels 5. The said plate 3 is provided with the slotted and perforated lugs 7, 8 and 9, adapted to receive and secure the arms 4 which are preferably curved outwardly to permit of a rearward folding. The said arms 4 are bifurcated at their forward ends and are provided with proper wheels 6 of much smaller size than the said wheels 5. They are also pivotally mounted in the lugs 7, and can be secured in the lugs 9 by a proper key or pin when my improvement is used to elevate a barrel or other weight, and can be swung around at right angles to said position and secured in the said lugs 8 in like manner, when it is desired to use the said truck for general purposes, seen in dotted outline in Fig. 1.

The said truck frame is also provided with proper feet 30 which are secured to the cross rods 26 and 28, and are adapted to support the rear end of said truck when placed in a horizontal position, and said feet if desired can be strengthened by the lateral braces 36. At suitable points on the cross bars 26 and 28 are rigidly fixed the longitudinal plates 17 equidistant from the ends of said cross-bars. At or near the rear end of the said plates 17 are pivotally mounted the yokes 18 and 19, the yoke 18 being somewhat extended and having on its free or looped end the pivotally mounted hand-lever 20, adapted to elevate the barrel or other weight by engaging the rack-bar 21. The yoke 19 is provided with a suitable downwardly projecting handle integral therewith, and is also adapted to engage the said rack-bar in the manner hereinafter described.

The adjustable sliding frame is formed of the side piece 11, the rear end piece 13, and the cross plates 14, 15 and 16 rigidly secured upon the lower face of the said side piece 11. The forward ends of the said side pieces are connected by the rigidly mounted metallic loading ledge 27 of the usual form.

The cross pieces 14, 15 and 16 project at both ends sufficiently beyond the side pieces 11 to rest in the guide-ways 2', and are at the same time adapted to pass by the upturned ends of the plates 26 and 28. Upon the upper surface of the said plates 14, 15 and 16 midway their extremities is rigidly mounted the plate 12 having upon its upper surface a longitudinal slot in which is pivotally mounted the rod 22 having a handle 35 and a slidable holding hook or claw 23 adapted to clutch the chine of the barrel. The latch 24 on the end piece 13 is adapted to hold the rod 22 in the said slot. Upon the lower surface of the said plates directly opposite the said plate 12, is rigidly fixed the rack-bar 21 having forwardly pointing teeth and is adapted to form a locking engagement with the hand-lever 20 and the yoke 19. Upon the lower face of the cross-plate 28 directly beneath the said rack-bar is rigidly fixed the spring clamp 29, or other retaining device adapted to secure the hand-lever 20 in a longitudinal position with the handle thereof pointing forwardly.

The operation of my improved elevating truck thus described is as follows: When it is desired to move or elevate a heavy barrel, the wheel mounted arms 4 are secured in the slotted lugs 9, which thereby prevents tipping forward when the weight is in position thereon, the truck is elevated to a vertical position as seen in Fig. 1, the sliding frame securely mounted in the guide-ways 2' is lowered to its lowest limit, and the loading ledge is insinuated under the barrel, which is then tipped back and secured upon said ledge by the holding claw 23 adapted to clutch the inner face of the chine of the barrel. The truck with the barrel thus secured thereon, is readily transported to any desired place. The operator then disengages the hand-lever 20 from its fastening 29, places its operating end in engagement with the said rack-bar, and with the yoke 18 as a fulcrum elevates the sliding frame with the barrel thereon, one notch at a time. In this manner the operator can readily elevate a weight of eight hundred pounds with one hand. When the said truck is in a vertical position the yoke 19 is normally in engagement with the said rack-bar 21, so that after each upward movement of the said weight by the said hand-lever, the yoke 19 will automatically engage the next lower tooth on the said rack-bar, and thus at all times during such operation it forms a locking engagement with said rack-bar. The barrel thus elevated is readily removed, the hand-lever 20 is replaced in the clasp 29, the bar 22 is returned to its position and secured by the latch 24, and the sliding frame is lowered by its own weight when disengaged from the yoke 19. The pivoted arms 4 being replaced in the slotted lugs 8 and secured as described, my invention is again ready for use as an ordinary truck.

It is obvious that the pivoted arms 4 could be made to serve the same purpose of bracing the truck when operated in a vertical position, without the use of the wheels 6, though I prefer the construction shown. It is also obvious that the grooved piece 12 may be omitted and the rod 22 otherwise pivotally secured to the cross-piece 15.

Having thus described my invention, what I desire to secure by Letters Patent is—

1. In a barrel-truck the described truck frame having suitable wheels and feet, as shown, provided with the pivoted arms 4, the yokes 18 and 19, the longitudinal guide-ways 2', and the pivotally mounted hand-lever 20, for elevating the load, as described, in combination with a sliding frame having a loading ledge, a hook mounted holding rod and a longitudinal rack-bar adapted for engagement with the said hand-lever and the said yoke 19, all substantially as described.

2. The combination in a barrel-truck, of a truck having the wheels 5, the feet 30, the pivotal arms 4 adapted to be secured in the lugs 8 or 9, the longitudinal guide-ways 2' for the sliding frame, and provided with the holding yoke 19 adapted for a normal engagement with the rack-bar 21, and the pivotally mounted hand-lever 20 adapted to elevate the said rack-bar, as described, and the sliding frame mounted in said guide-ways as shown, having a loading ledge 27, a hook-mounted holding-rod 22 and a rigid rack-bar 21, all substantially as described.

3. The described truck having the pivoted arms 4, as shown, guide-ways 2' for the barrel holding frame, and means for elevating the said frame by the aid of the rack-bar 21, in combination with a vertically adjustable frame mounted in said guide-ways, as described, having a loading ledge, a pivoted holding rod 22 having a hook or claw 23 for clutching the chine of the barrel, and a rigid rack-bar 21, as shown, substantially as described.

Signed by me, at Fort Wayne, Indiana, this 18th day of April, 1894.

ORRA J. BOWSER.

Witnesses:
C. J. McLAIN,
E. L. CRAW.